US010274396B2

(12) United States Patent
Nott et al.

(10) Patent No.: US 10,274,396 B2
(45) Date of Patent: Apr. 30, 2019

(54) FLEXIBLE PIPE BODY AND SENSING METHOD HAVING A CURVATURE SENSOR AND TENSILE ARMOUR WIRE

(71) Applicant: GE Oil & Gas UK Limited, Nailsea, Bristol (GB)

(72) Inventors: Philip Michael Hunter Nott, Tyne and Wear (GB); Suranjith Warnakulasuriya, Nottingham (GB); John Cross McNab, Tyne and Wear (GB); Geoffrey Stephen Graham, Tyne and Wear (GB)

(73) Assignee: GE Oil & Gas UK Limited, Nailsea, Bristol (GB)

(*) Notice: Subject to any disclaimer, the term of this patent is extended or adjusted under 35 U.S.C. 154(b) by 111 days.

(21) Appl. No.: 15/321,160

(22) PCT Filed: May 22, 2015

(86) PCT No.: PCT/GB2015/051511
§ 371 (c)(1),
(2) Date: Dec. 21, 2016

(87) PCT Pub. No.: WO2016/001617
PCT Pub. Date: Jan. 7, 2016

(65) Prior Publication Data
US 2017/0199100 A1      Jul. 13, 2017

(30) Foreign Application Priority Data
Jul. 3, 2014    (GB) .................................. 1411874.9

(51) Int. Cl.
*G01M 5/00*       (2006.01)
*G01M 11/08*      (2006.01)
(Continued)

(52) U.S. Cl.
CPC .......... *G01M 11/086* (2013.01); *F16L 11/083* (2013.01); *F16L 11/12* (2013.01);
(Continued)

(58) Field of Classification Search
CPC .......... F16L 11/16; F16L 11/083; F16L 11/12; F16L 11/04; F16L 11/082; F16L 53/002;
(Continued)

(56) References Cited

U.S. PATENT DOCUMENTS 5,343,738 A * 9/1994 Skaggs ................. F16L 11/121
                                                      138/113
5,918,267 A * 6/1999 Evans ..................... G01M 3/165
                                                      174/11 R
(Continued)

FOREIGN PATENT DOCUMENTS

CN    103348087 A    10/2013
CN    103348087 A    10/2013
(Continued)

OTHER PUBLICATIONS

International Search Report and Written Opinion of the International Searching Authority, dated Jul. 31, 2015, for corresponding International Application No. PCT/GB2015/051511, 13 pages.
(Continued)

*Primary Examiner* — Lisa M Caputo
*Assistant Examiner* — Brandi N Hopkins
(74) *Attorney, Agent, or Firm* — Klarquist Sparkman, LLP (57) ABSTRACT

A flexible pipe body comprising an elongate curvature sensor and a tensile armor layer. The elongate curvature sensor incorporates a strain sensor arranged to provide an indication of bending strain applied to the curvature sensor. The tensile armor layer comprises helically wound tensile armor wires. The curvature sensor is positioned within the
(Continued)

tensile armor layer helically wound adjacent to at least one tensile armor wire such that bending strain applied to the flexible pipe body is transmitted to the curvature sensor. The curvature sensor is smaller than an adjacent tensile armor wire in at least one of depth and width and arranged to slide longitudinally relative to the adjacent tensile armor wire.

18 Claims, 6 Drawing Sheets

(51) Int. Cl.
*F16L 11/12* (2006.01)
*G01B 11/16* (2006.01)
*F16L 11/08* (2006.01)

(52) U.S. Cl.
CPC ............ *G01B 11/18* (2013.01); *G01M 5/0025* (2013.01); *G01M 5/0041* (2013.01); *G01M 5/0091* (2013.01)

(58) Field of Classification Search
CPC ................ F16L 2011/04; F16L 11/081; Y10T 428/1393; G01M 11/086; G01M 5/0025; G01M 5/0091; G01M 5/0041; G01M 3/182; G01M 3/38; G01M 3/18; G01B 11/18; B05D 3/007; B29C 47/021; B29C 47/065; B29C 47/0023; B29C 47/061; B29C 71/0009; C08J 7/02; C08J 7/12
See application file for complete search history.

(56) References Cited

U.S. PATENT DOCUMENTS

| | | | | |
|---|---|---|---|---|
| 6,305,427 B1* | 10/2001 | Priest, II | ................. | F16L 11/12 138/104 |
| 8,087,430 B1* | 1/2012 | Betz | ........................ | F16L 11/12 138/104 |
| 9,505,026 B2* | 11/2016 | Harries | ............... | B29C 71/0009 |
| 2004/0168521 A1* | 9/2004 | Andersen | ............ | E21B 47/0006 73/807 |
| 2005/0229991 A1* | 10/2005 | Hardy | ................... | F16L 11/083 138/127 |
| 2006/0045408 A1* | 3/2006 | Jones | ...................... | E21B 17/01 385/12 |
| 2006/0233482 A1* | 10/2006 | Rambow | ............. | E21B 47/0006 385/12 |
| 2007/0297712 A1* | 12/2007 | Meneghini | ............. | G01B 11/18 385/13 |
| 2014/0116564 A1 | 5/2014 | McNab | | |

FOREIGN PATENT DOCUMENTS

| | | | | |
|---|---|---|---|---|
| EP | 1635034 A1 | 3/2006 | | |
| EP | 2063068 A1 | 5/2009 | | |
| EP | 2065551 A2 | 6/2009 | | |
| GB | 2458955 A | 10/2009 | | |
| WO | WO2008/021881 A2 | 2/2008 | | |
| WO | WO2008/077410 A1 | 7/2008 | | |
| WO | WO2009/156486 A1 | 12/2009 | | |
| WO | WO2012/059729 A1 | 5/2012 | | |
| WO | WO2012/062328 A1 | 5/2012 | | |
| WO | WO 2012059729 A1 * | 5/2012 | ......... | E21B 47/0006 |
| WO | WO2012/097241 A1 | 7/2012 | | |
| WO | WO2013/023664 A1 | 2/2013 | | |
| WO | WO2013/098545 A1 | 7/2013 | | |
| WO | WO2014/049292 A1 | 4/2014 | | |

OTHER PUBLICATIONS

Search Report from the United Kingdom Intellectual Property Office for corresponding United Kingdom Application No. GB1411874.9, dated Oct. 28, 2014, 6 pages.
First Office Action and Search Report (including English translation) from National Intellectual Property Administration, People's Republic of China, for Chinese Patent Application No. 201580036288.0, dated Jun. 20, 2018, 22 pages.
Machine Translation and First Office Action and Search issued in connection with corresponding CN Application No. 201580036288.0 dated Jun. 20, 2018.

* cited by examiner

FLEXIBLE PIPE BODY AND SENSING METHOD HAVING A CURVATURE SENSOR AND TENSILE ARMOUR WIRE

CROSS REFERENCE TO RELATED APPLICATIONS

This is the U.S. National Stage of International Application No. PCT/GB2015/051511, filed May 22, 2015, which in turn claims the benefit of and priority to United Kingdom Patent Application No. GB1411874.9, filed Jul. 3, 2014.

The present invention relates to a curvature sensor and a method of sensing curvature. In particular, the present invention relates to a flexible pipe body incorporating a curvature sensor and a sensing method suitable for monitoring the curvature of a flexible pipe body.

Traditionally, flexible pipe is utilised to transport production fluids, such as oil and/or gas and/or water, from one location to another. Flexible pipe is particularly useful in connecting a sub-sea location (which may be deep underwater, say 1000 meters or more) to a sea level location. The flexible pipe may have an internal diameter of typically up to around 0.6 m (e.g. diameters may range from 0.05 m up to 0.6 m). Flexible pipe is generally formed as an assembly of a flexible pipe body and one or more end fittings. The flexible pipe body is typically formed as a combination of layered materials that form a pressure-containing conduit. The pipe structure allows large deflections without causing bending stresses that impair the flexible pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wire forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a tensile armour layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased. Flexible pipe may also be used for shallow water applications (for example less than around 500 meters depth) or even for shore (overland) applications.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used the weight of the flexible pipe increases. Ultimately the weight of the flexible pipe can become a limiting factor in using flexible pipe. Additionally manufacturing flexible pipe using thicker and thicker material increases material costs appreciably, which is also a disadvantage.

Figure 2:
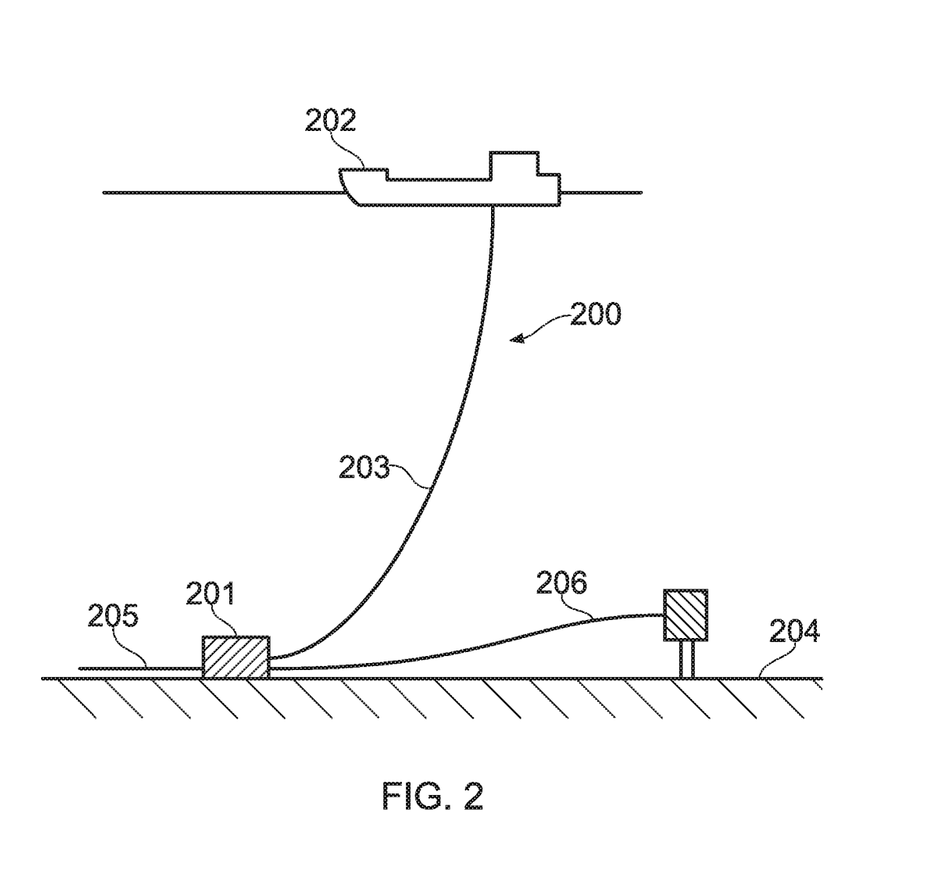
FIG. 2 illustrates a riser assembly incorporating a flexible pipe body.

The end fittings of a flexible pipe may be used for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. FIG. 2 illustrates a riser assembly 200 suitable for transporting production fluid such as oil and/or gas and/or water from a sub-sea location 201 to a floating production facility 202.

Flexible pipes may extend a considerable distance. Additionally, at the sea surface, they may be coupled to floating production platforms that are free to move within a limited, tethered range. Consequently, flexible pipes may move considerably over time. Movement may include bending of the flexible pipe. There may also be dynamic or periodic movement (including bending) as a result of wave action. Such flexible pipe movement may risk damage to the flexible pipe, particularly where bending exceeds the capacity of the pipe body structure to absorb that bending. A flexible pipe may be particularly susceptible to damage as a result of bending stress at an end fitting coupled to a flexible pipe body. Consequently, it is desirable to measure the curvature of a flexible pipe. If the curvature is monitored over time, changes that may expose the pipe to damage can be detected as they occur. Monitoring curvature may include continuously monitoring the curvature of a flexible pipe and hence observing bending as it occurs. Alternatively, the monitoring may be periodic to determine the current shape of the flexible pipe at the time of measurement.

EP-2065551-A2 (Schlumberger Holdings Limited (GB), Tortola (VG)) discloses a flexible pipe having an integral hoop strain sensor for detecting the formation and location of a blockage within the pipe by sensing a localised pipe body diameter variation due to an increase in fluid pressure. While localised changes in strain may indicate bending, flexible pipes are subject to strain along the length of the flexible pipe which may obscure the effects of bending rendering it difficult or impossible to determine the true curvature of a flexible pipe.

Certain embodiments of the invention provide the advantage that the curvature of a flexible pipe can be determined. In certain embodiments of the invention the curvature of the flexible pipe may be measured along part or the whole of the length of the flexible pipe. Measuring the curvature of a flexible pipe may allow excessive bending of the flexible pipe to be detected. Excessive bending may give rise to a flexible pipe body defect, and so once detected, remedial action can be taken. According to certain embodiments of the present invention a curvature sensor is installed within the structure of a flexible pipe body and a curvature detector is coupled to the curvature sensor through a topside end fitting on board a production platform.

According to a first aspect of the present invention there is provided a flexible pipe body comprising: an elongate curvature sensor incorporating a strain sensor arranged to provide an indication of bending strain applied to the curvature sensor; and a tensile armour layer comprising helically wound tensile armour wires, the curvature sensor being positioned within the tensile armour layer helically wound adjacent to at least one tensile armour wire such that bending strain applied to the flexible pipe body is transmitted to the curvature sensor; wherein the curvature sensor is smaller than an adjacent tensile armour wire in at least one of depth and width and arranged to slide longitudinally relative to the adjacent tensile armour wire.

The curvature sensor may comprise: an elongate, flexible sensor body; and first and second elongate strain sensors disposed along the sensor body; wherein the first strain sensor may be disposed within a neutral plane of the sensor body such that bending of the sensor body in a plane extending along the length of the body and normal to the neutral plane does not apply strain to the first strain sensor; wherein the second strain sensor may be offset from the neutral plane; and wherein strain sensed by the first strain sensor may be indicative of tensile strain applied along the length of the sensor body and strain sensed by the second strain sensor may be indicative of the combination of tensile strain applied along the length of the sensor body and strain induced by bending the sensor body in the plane extending along the length of the sensor body and normal to the neutral plane.

According to a second aspect of the present invention there is provided a pipeline apparatus comprising: a flexible pipe body as described above; an end fitting coupled to at least one end of the pipe body; and a detection apparatus coupled to the first and second strain sensors of the curvature sensor through the end fitting; wherein the detection apparatus is arranged to measure a strain profile along each of the strain sensors.

According to a third aspect of the present invention there is provided a method of sensing the shape of a flexible pipe body, the flexible pipe body comprising an elongate curvature sensor incorporating at least one strain sensor arranged to provide an indication of bending strain applied to the curvature sensor, and a tensile armour layer comprising helically wound tensile armour wires, the curvature sensor being positioned within the tensile armour layer helically wound adjacent to at least one tensile armour wire such that bending strain applied to the flexible pipe body is transmitted to the curvature sensor, wherein the curvature sensor body is smaller than an adjacent tensile armour wire in at least one of depth and width and arranged to slide longitudinally relative to the adjacent tensile armour wire, the method comprising: calculating a bending strain profile for the strain sensor; and determining the shape of the curvature sensor from the bending strain profile; wherein the determined shape of the curvature sensor is indicative of the shape of the flexible pipe body.

The curvature sensor may comprise: an elongate, flexible sensor body; and first and second elongate strain sensors disposed along the sensor body; wherein the first strain sensor may be disposed within a neutral plane of the sensor body such that bending of the sensor body in a plane extending along the length of the sensor body and normal to the neutral plane does not apply strain to the first strain sensor; wherein the second strain sensor may be offset from the neutral plane; and wherein strain sensed by the first strain sensor may be indicative of tensile strain applied along the length of the sensor body and strain sensed by the second strain sensor may be indicative of the combination of tensile strain applied along the length of the sensor body and strain induced by bending the sensor body in the plane extending along the length of the sensor body and normal to the neutral plane; and wherein the method may further comprise measuring a strain profile for each of first and second strain sensors disposed along an elongate, flexible sensor body; and wherein calculating a bending strain profile may comprises calculating a bending strain profile indicative of bending strain applied to the curvature sensor from the strain profiles of the first and second strain sensors According to a fourth aspect of the present invention there is provided a method of forming a flexible pipe body, the method comprising: helically winding tensile armour wires to form a tensile armour layer; wherein an elongate curvature sensor is helically wound within the tensile armour layer adjacent to at least one tensile armour wire such that bending strain applied to the flexible pipe body is transmitted to the curvature sensor, the curvature sensor comprising a strain sensor arranged to provide an indication of bending strain applied to the curvature sensor; wherein the curvature sensor body is smaller than an adjacent tensile armour wire in at least one of depth and width and arranged to slide longitudinally relative to the adjacent tensile armour wire.

The curvature sensor may comprise: an elongate, flexible sensor body; and first and second elongate strain sensors disposed along the sensor body; wherein the first strain sensor may be disposed within a neutral plane of the sensor body such that bending of the sensor body in a plane extending along the length of the sensor body and normal to the neutral plane does not apply strain to the first strain sensor; wherein the second strain sensor may be offset from the neutral plane; and wherein strain sensed by the first strain sensor may be indicative of tensile strain applied along the length of the sensor body and strain sensed by the second strain sensor may be indicative of the combination of tensile strain applied along the length of the sensor body and strain induced by bending the sensor body in the plane extending along the length of the sensor body and normal to the neutral plane.

According to a fifth aspect of the present invention there is provided a method of forming a pipeline apparatus, the method comprising: forming a flexible pipe body as described above; coupling an end fitting to at least one end of the pipe body; and coupling a detection apparatus to the curvature sensor through the end fitting; wherein the detection apparatus is arranged to: calculate a bending strain profile indicative of bending strain applied to the curvature sensor from the strain profiles of the first and second strain sensors; and determine the shape of the flexible pipe body from the bending strain profile.

There is further disclosed a curvature sensor comprising: an elongate, flexible body; and first and second elongate strain sensors disposed along the body; wherein the first strain sensor is disposed within a neutral plane of the body such that bending of the body in a plane extending along the length of the body and normal to the neutral plane does not apply strain to the first strain sensor; wherein the second strain sensor is offset from the neutral plane; and wherein strain sensed by the first strain sensor is indicative of tensile strain applied along the length of the body and strain sensed by the second strain sensor is indicative of the combination of tensile strain applied along the length of the body and strain induced by bending the body in the plane extending along the length of the body and normal to the neutral plane.

Each strain sensor may comprise an optical fibre strain sensor coupled to the body such that tensile strain applied to the body is transmitted to both strain sensors and bending strain applied to the body is transmitted to the second strain sensor.

The curvature sensor may further comprise a temperature sensor disposed along the body. The temperature sensor may comprise an optical fibre temperature sensor coupled to the body such that tensile strain and bending strain applied to the body is not transmitted to the optical fibre.

There is further disclosed a flexible pipe body including a curvature sensor as described above, the curvature sensor being incorporated into the flexible pipe body structure along at least part of its length such that bending strain applied to the flexible pipe body is transmitted to the curvature sensor.

The curvature sensor may be arranged such that bending the flexible pipe body causes the curvature sensor body to bend in the plane extending along the length of the body and normal to the neutral plane.

The curvature sensor may be helically wound around the longitudinal axis of the flexible pipe body.

The flexible pipe body may further comprise a tensile armour layer; wherein the tensile armour layer comprises helically wound tensile armour wires and the curvature sensor is positioned within the tensile armour layer helically wound adjacent to at least one tensile armour wire.

The curvature sensor body may be smaller than an adjacent tensile armour wire in at least one of depth and width and arranged to slide longitudinally relative to the adjacent tensile armour wire.

There is further disclosed a pipeline apparatus comprising: a flexible pipe body as described above; an end fitting coupled to at least one end of the pipe body; and a detection apparatus coupled to the first and second strain sensors of the curvature sensor through the end fitting; wherein the detection apparatus is arranged to measure a strain profile along each of the strain sensors.

The detection apparatus may be arranged to calculate a bending strain profile indicative of bending strain applied to the curvature sensor from the strain profiles of the first and second strain sensors.

The detection apparatus may be further arranged to measure a temperature profile along the temperature sensor and to adjust the calculation of the bending strain profile to account for the effect of temperature on the strain profiles for each of the strain sensors.

The detection apparatus may be further arranged to determine the shape of the flexible pipe body from the bending strain profile.

There is further disclosed a method of sensing curvature, the method comprising: measuring a strain profile for each of first and second strain sensors disposed along an elongate, flexible body; wherein the first strain sensor is disposed within a neutral plane of the body such that bending of the body in a plane extending along the length of the body and normal to the neutral plane does not apply strain to the first strain sensor; wherein the second strain sensor is offset from the neutral plane; and wherein strain sensed by the first strain sensor is indicative of tensile strain applied along the length of the body and strain sensed by the second strain sensor is indicative of the combination of tensile strain applied along the length of the body and strain induced by bending the body in the plane extending along the length of the body and normal to the neutral plane; the method further comprising: calculating a bending strain profile indicative of bending strain applied to the curvature sensor from the strain profiles of the first and second strain sensors; and determining the shape of the curvature sensor from the bending strain profile.

The curvature sensor may be incorporated into the structure of a flexible pipe body along at least part of its length such that bending strain applied to the flexible pipe body is transmitted to the curvature sensor; wherein the shape of the curvature is indicative of the shape of the flexible pipe body.

There is further disclosed a method of forming a flexible pipe body, the method comprising: incorporating a curvature sensor into the structure of a flexible pipe body along at least part of its length such that bending strain applied to the flexible pipe body is transmitted to the curvature sensor, the curvature sensor comprising: an elongate, flexible body; and first and second elongate strain sensors disposed along the body; wherein the first strain sensor is disposed within a neutral plane of the body such that bending of the body in a plane extending along the length of the body and normal to the neutral plane does not apply strain to the first strain sensor; wherein the second strain sensor is offset from the neutral plane; and wherein strain sensed by the first strain sensor is indicative of tensile strain applied along the length of the body and strain sensed by the second strain sensor is indicative of the combination of tensile strain applied along the length of the body and strain induced by bending the body in the plane extending along the length of the body and normal to the neutral plane.

The method may further comprise: helically winding tensile armour wires to form a tensile armour layer; wherein the curvature sensor is helically wound within the tensile armour layer adjacent to at least one tensile armour wire.

There is further disclosed a method of forming a pipeline apparatus, the method comprising: providing a flexible pipe body as described above; coupling an end fitting to at least one end of the pipe body; and coupling a detection apparatus to the curvature sensor through the end fitting; wherein the detection apparatus is arranged to: calculate a bending strain profile indicative of bending strain applied to the curvature sensor from the strain profiles of the first and second strain sensors; and determine the shape of the flexible pipe body from the bending strain profile.

The pipe may be for high pressure use in oil and gas extraction.

Embodiments of the invention are further described hereinafter with reference to the accompanying drawings, in which.

In the drawings like reference numerals refer to like parts.

Figure 1:
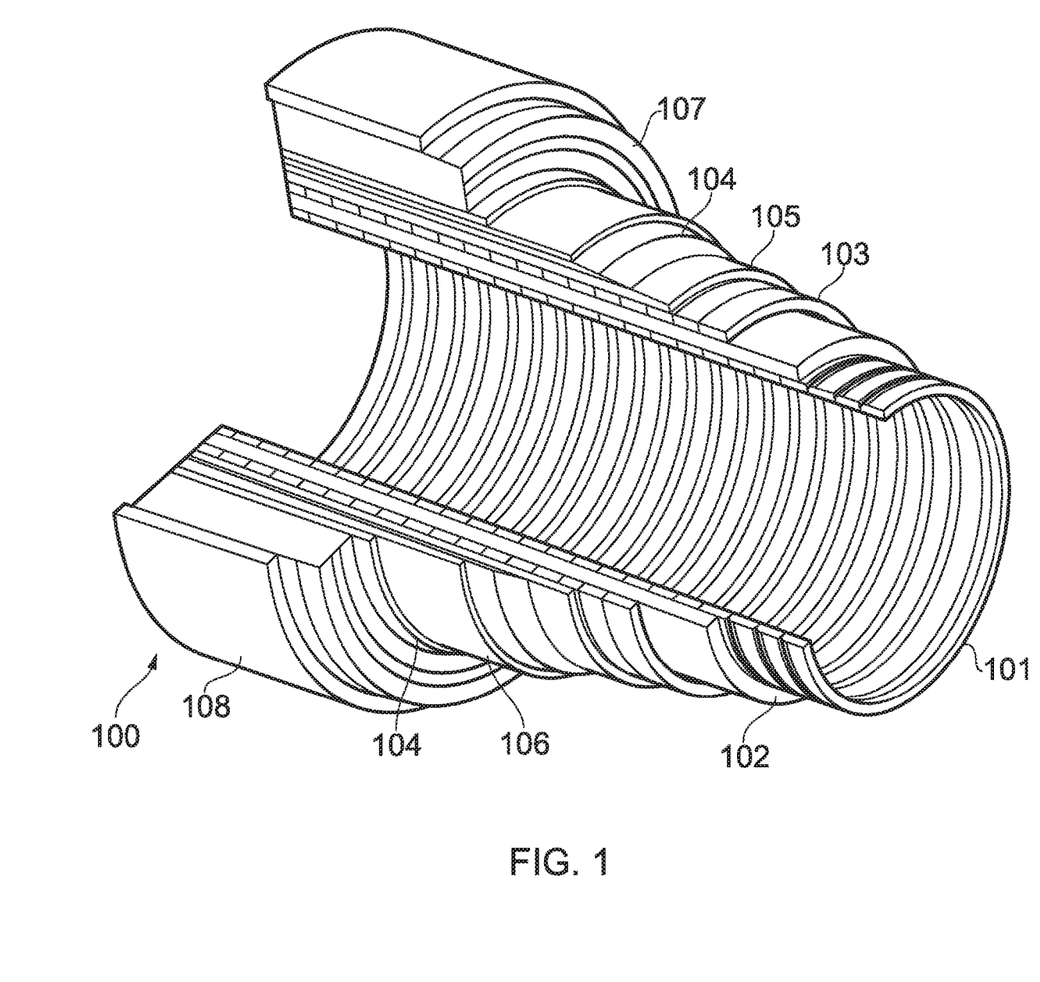
FIG. 1 illustrates a flexible pipe body.

Throughout this description, reference will be made to a flexible pipe. It will be understood that a flexible pipe is an assembly of a portion of a flexible pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality metallic of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of flexible pipe body 100 together with an end fitting located at one end or both ends of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line 205. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings. FIG. 2 also illustrates how portions of flexible pipe can be utilised as a flow line 205 or jumper 206. It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

According to an embodiment of the present invention, the curvature of a flexible pipe may be measured using a curvature sensor which is positioned within the structure of the flexible pipe body. For instance, an elongate curvature sensor may be substituted for a structural component of the flexible pipe body (for instance a tensile wire within a tensile armour layer 105, 106). However, it will be appreciated that the curvature sensor may be incorporated into the structure of the flexible pipe within a different layer or may be coupled to the flexible pipe in other ways, for instance by coupling to the outside or inside of the flexible pipe. Advantageously, incorporation within a tensile armour layer provides a degree of protection to the curvature sensor. Additionally, it is important to avoid overstraining the curvature sensor, which could occur if the curvature sensor were to be rigidly coupled to a flexible pipe which is then subjected to a high degree of bending over a relatively short length. As will be described in greater detail below, incorporating the curvature sensor into a tensile armour layer such that the sensor can slide relative to adjacent tensile armour wires allows the sensor to accommodate a high degree of bending.

According to an embodiment of the present invention, the elongate curvature sensor may comprise at least one strain sensor arranged to provide an indication of bending strain applied to the curvature sensor. In certain embodiments described below the elongate curvature sensor comprises first and second strain sensors. A first strain sensor is positioned within a neutral plane of a curvature sensor body such that it is not strained by bending of the curvature sensor. Specifically, for an elongate sensor, the neutral plane comprises an plane extending through the sensor generally parallel to the longitudinal axis of the sensor for which bending within a perpendicular plane which is also parallel to the longitudinal axis of the sensor does not cause a change in length (and therefore strain) for a strain sensor positioned within that neutral plane. According to the material properties of the curvature sensor body, the neutral plane may be generally positioned within the middle of the body. Consequently, this means that strain sensed by the first strain sensor results only from tension applied along the length of the curvature sensor.

At least one second strain sensor is positioned offset from the neutral plane of the curvature sensor generally along the length of the sensor. The second strain sensor senses strain applied along the length of the curvature sensor, but also senses strain resulting from bending of the curvature sensor in a perpendicular plane which is also parallel to the longitudinal axis of the sensor. If the curvature sensor is coupled to a flexible pipe body then bending of the curvature sensor results from bending of the flexible pipe and therefore the measured bending strain is indicative of bending of the flexible pipe (and hence the curvature of the pipe can be determined). The strain sensed by the first strain sensor may be used to compensate for tensile strain sensed by the second strain sensor in order to calculate the strain caused only by bending of the flexible pipe body. It will be appreciated that redundancy may be generated by providing multiple first and/or second strain sensors.

According to certain embodiments of the present invention the first and second strain sensors may comprise optical strain sensors. However, the present invention is not limited to the use of optical strain sensors. Rather, the present invention encompasses the use of any strain sensing technology known to the skilled person that allows strain to be sensed continuously or at discrete locations spaced apart along the length of an elongate sensor that may be deployed along the length of a flexible pipe body. Preferably the strain sensors provide a continuous profile of sensed strain along their length. Additionally, certain embodiments of the preset invention will be described in connection with a strain curvature sensor deployed within a tensile armour layer of a flexible pipe body. However, the present invention is not limited to this and a suitable strain curvature sensor could be deployed anywhere within the structure of a flexible pipe body, or coupled to a flexible pipe body. The only requirement is that there are at least first and second strain sensors, with one sensor being positioned within a neutral plane of a curvature sensor and one positioned offset from the neutral plane.

There is an increasing desire for the continual monitoring of various parameters of flexible pipes, such as strain, temperature and acoustics, to help changes affecting the flexible pipe. Such changes could result in structural failure of the flexible pipe, for instance leakage, wire breakage, over-bending in the pipe (bending past the maximum allowable amount without the risk of damage), and interaction between the pipe and external environment such as collisions with other objects, for example. One way which has been suggested for monitoring parameters of flexible pipes is the use of an optical fibre system. As a method of monitoring strain, temperature and acoustics in flexible pipes it is known to incorporate bare optical fibres and/or Fibre In Metal Tubes (FIMTs) within a protective conduit along the length of a flexible pipe body and connected to an interrogating detector outside of the flexible pipe. An optical fibre may be used as a sensing element or sensor. The fibre is used as an optical fibre for transmitting light and is generally made of glass. The optical fibres can be used, for instance, as strain gauges, temperature gauges and temperature indicators. Temperature or strain measurements can be made which are localised, distributed or semi-distributed depending upon the manner in which the optical fibre is interrogated and regions/sensors in the optical fibre are arranged. Strain can be sensed by including a FIMT that is bonded to a conduit supporting the FIMT such that strain applied to the conduit is transferred to the FIMT. Temperature can be monitored by including a FIMT that is not bonded to the inside of the conduit, and is therefore able to record temperature independently to strain.

Figure 3:
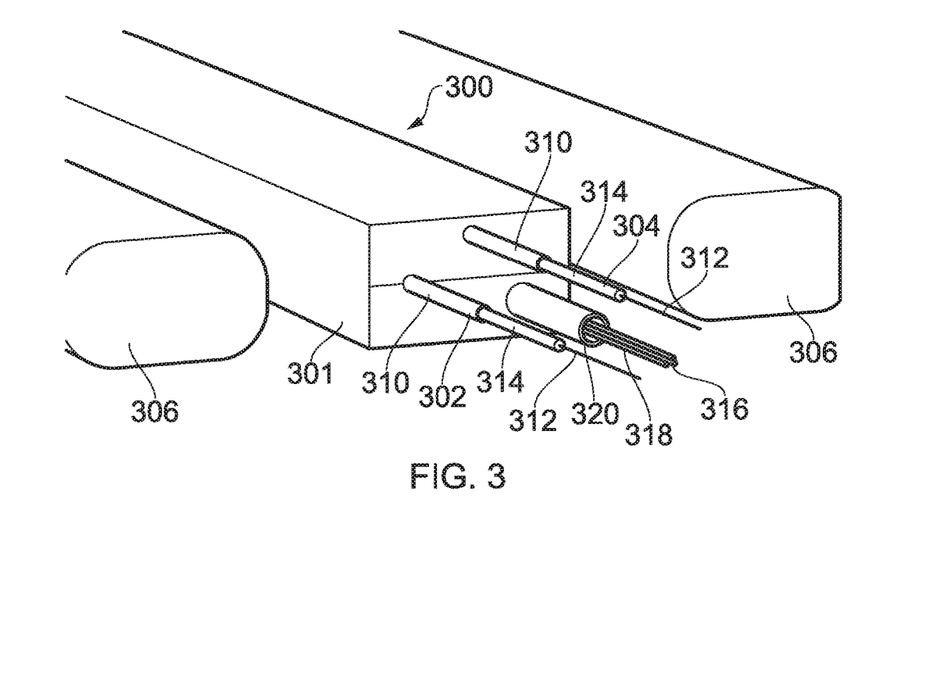
FIG. 3 illustrates a curvature sensor forming part of a flexible pipe body according to an embodiment of the present invention.
Figure 4:
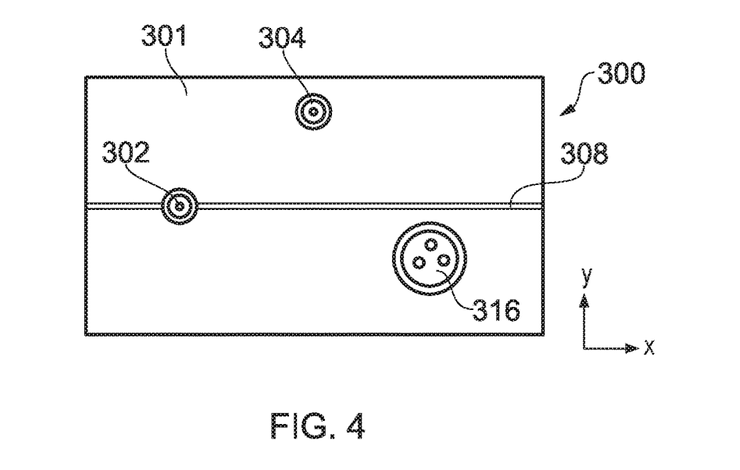
FIG. 4 illustrates a cross section of the curvature sensor of FIG. 3.

Referring now to FIGS. 3 and 4, a curvature sensor 300 according to an embodiment of the invention will now be described. The curvature sensor 300 is suitable for sensing strain caused by bending of the curvature sensor 300 (and hence bending of a flexible pipe body incorporating the curvature sensor 300). FIG. 4 is a cross section of the curvature sensor 300 of FIG. 3 looking into the end of the curvature sensor 300 in the perspective view of FIG. 3. The curvature sensor 300 comprises a body 301. A rectangular body profile is shown, however the shape may vary. For instance, the corners may be rounded. The curvature sensor 300 is shaped such that it can take the place of a tensile armour wire 306 of a tensile armour layer 105, 106 within a flexible pipe body. The body 301 may be formed from a polymer. A low friction polymer may be selected such that the body can slide relative to neighbouring tensile armour wires 306. Preferably, the curvature sensor 300 is not bonded to the pipe structure to avoid overstraining the curvature sensor 300. For a curvature sensor 300 incorporated into a tensile armour layer, preferably the curvature sensor 300 is slightly smaller than the neighbouring tensile armour wires 306 in at least one dimension. For instance, for armour wires that are approximately 12 mm by 7 mm the curvature sensor 300 may be approximately 12 mm by 6.8 mm. The result of the reduced depth is that the curvature sensor 300 can slide relative to neighbouring tensile armour wires 306 so that strain applied by a high degree of localised bending can be relieved and distributed along the length of the curvature sensor 300.

The curvature sensor 300 encapsulates first and second strain sensors 302, 304. The first and second strain sensors 302, 304 may comprise strain sensing FIMTs. Each FIMT comprises a metal tube 310 to protect the optical fibre and which is bonded to the sensor body 301, or otherwise firmly secured to the curvature sensor body, such that strain applied to the curvature sensor 300 in tension or bending is directly transferred to each FIMT. Within each FIMT the optical fibre 312 is embedded within a gel or other compound 314 such that strain applied to the metal tube 310 is transferred to the optical fibre 312. In this way, the strain applied to the curvature sensor can be measured by monitoring the transmission and reflection of light along the optical fibre 312, as will be described below.

The curvature sensor 300 is arranged to detect bending of a flexible pipe, which comprises bending of the pipe about an axis which is perpendicular to the longitudinal axis of the flexible pipe. Referring to the cross section of FIG. 4, when coupled to a flexible pipe body the Y axis is in the radial direction of the flexible pipe and the X axis is generally circumferential about the flexible pipe (for a curvature sensor which is generally arranged along the longitudinal axis of the flexible pipe). It will be appreciated that in certain embodiments the curvature sensor 300 may be helically wound about the flexible pipe body so the X axis is not truly circumferential. The curvature sensor 300 may be helically wound with a fixed pitch. Bending of the flexible pipe causes the curvature sensor 300 to bend about the X axis. In the cross section of FIG. 4 the first strain sensor 302 is positioned within the neutral plane 308 of the curvature sensor 300.

As discussed above the neutral plane 308 is a plane within which there is no change in length caused by bending of the curvature sensor 300 in a plane parallel to the Y axis and the longitudinal axis of the curvature sensor 300. Bending will cause the sensor body 301 on one side of the neutral axis 308 to be compressed and the sensor body 301 on the other side of the neutral axis 308 to be stretched. It will be understood therefore that when the curvature sensor 300 bends, the first strain sensor 302 does not change in length and so no strain is detected. The first strain sensor 302 therefore detects only tensile strain extending along the length of the curvature sensor 300. It will be understood that there may be a second neutral plane within the curvature sensor 300 at 90° to the first neutral plane 308 resulting from consideration of how the curvature sensor 300 bends when bent about the Y axis. However, when the curvature sensor 300 is positioned within a tensile armour layer 105, 106 bending of the curvature sensor 300 in the plane of the first neutral plane is substantially prevented by the construction of the flexible pipe body and so for certain embodiments of the curvature sensor 300 it is not necessary for the first strain sensor 302 to be positioned within the second neutral plane. The first strain sensor 302 may be offset from the centre of the curvature sensor 300 as shown in FIGS. 3 and 4 so long as it remains on the neutral plane 308.

The second strain sensor 304 is offset from the neutral plane 308 and so when the curvature sensor bends the second strain sensor 304 is stretched or compressed, which results in a measurable strain. It will be appreciated that there may be provided another second strain sensor 304 upon the opposite side of the neutral plane such that when the sensor is bent one second strain sensor 304 will be stretched and the other will be compressed. The second strain sensor 304 also detects tensile strain extending along the length of the curvature sensor, which could obscure the strain due to bending. However, by separately measuring the tensile strain using the first strain sensor 302 the effects of tensile strain can be compensated for. This compensation may be performed by subtracting the strain measured by the first strain sensor 302 from the strain sensed by the second strain sensor 304 such that the strain due only to bending can be calculated.

The strain limit of the curvature sensor is limited by the capability of the strain sensors to detect strain. Accordingly, a suitable sensor technique is selected according to the expected strain range. For a flexible pipe body of the type described above in connection with FIG. 1, it can be expected that the range of strain which would be experienced due to both tensile strain and bending strain results in a less than 1% change in length of the strain sensors even for the highest envisaged degree of bending: that is −1% (compression) to +1% (tension). Such a range of strain sensing can suitably be detected using a Brillouin detector coupled to the strain sensors (or separate Brillouin detectors coupled to each strain sensor).

Brillouin scattering occurs when light transmitted along an optical fibre interacts with periodic time and space variations in the refractive index of the optical fibre. For intense beams of light travelling along an optical fibre, variations in the electric field of the light beam produce acoustic waves within the optical fibre through electrostriction or radiation pressure. The beam undergoes Brillouin scattering from these vibrations, the scattered light typically being reflected in the opposite direction to the incoming beam in a process known as stimulated Brillouin scattering. The reflected scattered light may be detected. Brillouin scattering is strongly dependent upon both the temperature of the optical fibre and the material density of the optical fibre (which is affected by strain applied to the optical fibre). By analysing the returned scattered light from a pulse of light transmitted along the optical fibre, and in particular the time delay of the received scattered light, variations in Brillouin scattering, and hence variations in strain and temperature along the length of the optical fibre may be detected. A linear profile of changes in scattering along the optical fibres can be established. It is assumed that the skilled person will be familiar with the details of Brillouin detectors.

It will be appreciated that as Brillouin scattering is affected by both strain and temperature, it may be difficult or impossible to separate the two measurements using the strain sensors 302, 304 on their own. Consequently, to account for the effect of temperature variations along the length of the curvature sensor a further temperature sensor 316 is provided for measuring temperature. The temperature sensor 316 may comprises a loose filled FIMT such that the optical fibres 318 within metal tube 320 are not strained by bending of the curvature sensor or tensile strain applied to the curvature sensor. To ensure that the optical fibres 308 are not strained, the optical fibres may be inserted such that the length of fibres slightly exceeds the length of the metal tube to ensure that the optical fibres remain loose. Three optical fibres 318 are shown within temperature sensor 316. It will be appreciated that one optical fibre 318 is sufficient, however providing multiple optical fibres 318 allows for redundancy in the event of damage to one of the optical fibres 318, and may also allow a standard FIMT component to be incorporated into the curvature sensor.

In order to detect changes in temperature along the temperature sensor, such that these can be used to correct for the effects of changes in temperature for the strain sensor measurements, these changes in temperature can be directly measured using the temperature sensor. One such known approach using an optical fibre system is called Distributed Temperature Sensing (DTS). Advantageously, DTS allows temperature changes to be detected and located along the length of an optical fibre. In some forms of DTS, an absolute temperature profile can be established along the optical fibre (and hence along the flexible pipe body) as well as detecting transient changes in temperature. The use of DTS is particularly attractive for use in the oil and gas industry as it does not require the use of electronics or the passage of electrical signals within the flexible pipe body. Indeed the only electronics comprise the detection instrumentation coupled to an end of the optical fibre, and which may be positioned at one end of the flexible pipe body outside of the pipe body annulus.

DTS works by transmitting short duration pulses of light along the optical fibre and monitoring for the return of reflected light. The light pulses interact with the crystal lattice of the glass fibre and the frequency shift of backscattered light is dependent upon the temperature of the glass. The time at which each portion of the returned light arrives, relative to the time of the transmitted pulses, can be used to determine the location along the fibre from which the light is scattered. A temperature profile along the length of the fibre can be established. It is assumed that the skilled person will be familiar with the details of conventional DTS.

DTS systems for measuring and monitoring temperature profiles along optical fibres are commercially available and well used in the oil and gas industry. Typically, a DTS system can locate a temperature measurement to a spatial resolution of 1 m and with an accuracy of 1° C. A single DTS system may monitor an optical fibre extending along a pipeline for up to 30 km. A DTS system comprises an optical reflectometer coupled to an optical fibre, together with associated power supply and monitoring equipment. This may either comprise Optical Time Domain Reflectometry (OTDR) or Optical Frequency Domain Reflectometry (OFDR).

Figure 5:
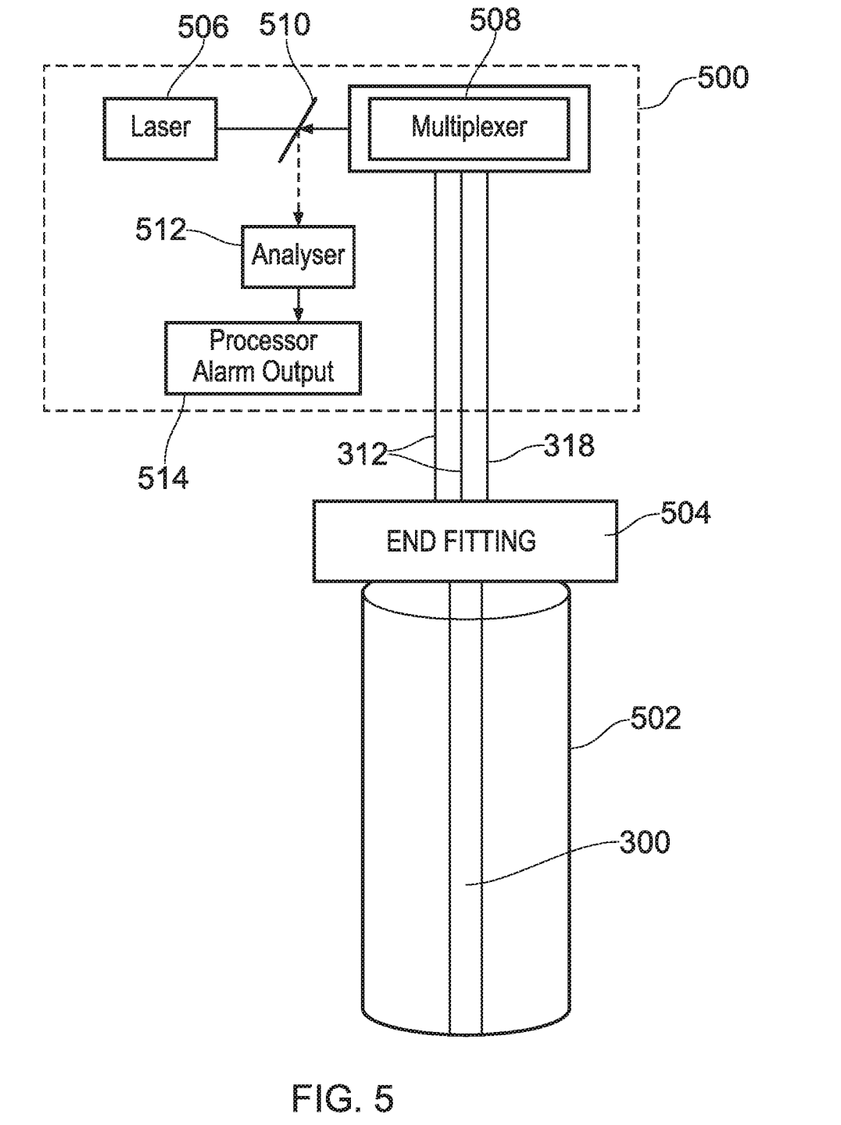
FIG. 5 illustrates a curvature detector coupled to a flexible pipe body incorporating the curvature sensor of FIG. 3 according to an embodiment of the present invention.

Referring now to FIG. 5, a curvature detector 500 will now be described. FIG. 5 illustrates the curvature detector 500 coupled to a flexible pipe body 502, which may be of the type shown in FIG. 1. The curvature detector 500 is arranged to measure the curvature of the flexible pipe body 502 along its length through monitoring the curvature sensor 300, to which it is coupled through an end fitting 504.

The curvature monitor 500 may comprise at least one optical reflectometer. The curvature FIG. 5 shows the optical sensor coupled to the optical fibres 312 and 318 for each of the first and second strain sensors 302, 304 and the temperature sensor 316 through a multiplexer 508. The multiplexer 508 allows each optical fibre to be monitored in turn. However, it will be appreciated that alternatively there may be a separate optical reflectometer for each optical fibre so that they may all be monitored simultaneously.

The optical reflectometer comprises a laser 506 arranged to generate pulses of light. The laser 506 is coupled to the multiplexer 508 through a partially reflecting mirror 510. Scattered or reflected returned light passes through the multiplexer 508 before being deviated from the original light path by the partially reflecting mirror 510. The returned light passes to an analyser 512. The analyser 512 is arranged to compare the transmitted light pulses and the returned light to provide a temperature profile along the length of the optical fibre 318 or a strain profile along the length of one of the optical fibres 312. The processor 514 is arranged to determine bending along the length of the curvature monitor 300 as measured by the second strain sensor 304 after subtracting the effects of tensile strain along the length of the curvature sensor 300 using the strain profile obtained from first strain sensor 302 and after accounting for the effects of temperature along the length of the curvature sensor 300 using the temperature profiled obtained from temperature sensor 316.

Figure 6:
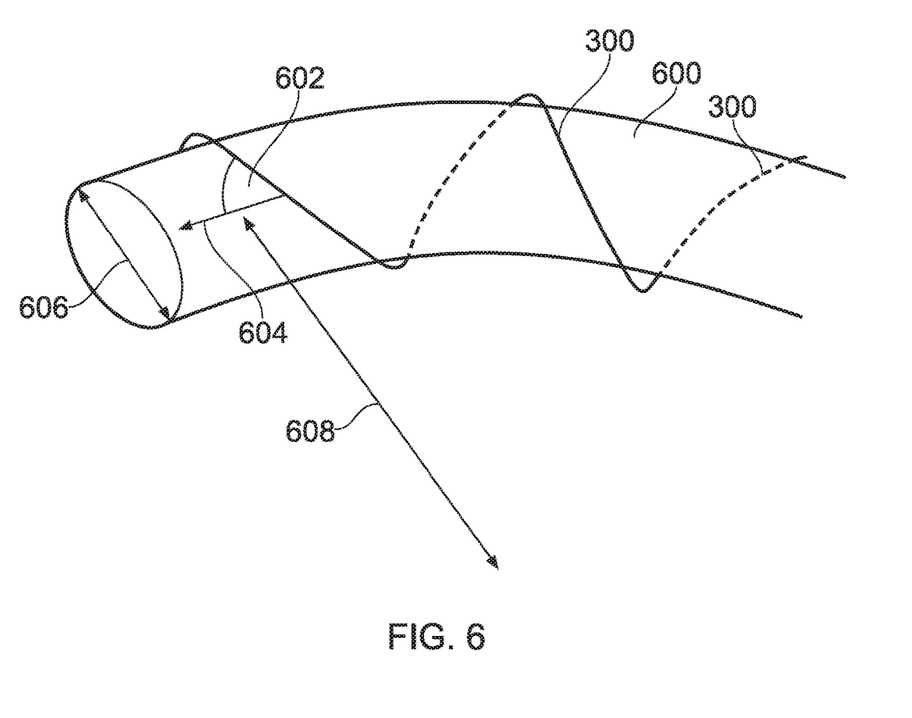
FIG. 6 illustrates the deployment of the curvature sensor of FIG. 3 along a flexible pipe body according to an embodiment of the present invention.

As noted above, in order for the invention to work effectively, the amount of strain generated by bending the curvature sensor 300 about its neutral axis needs to be within the measureable range of the interrogating Brillouin instrument. Referring to FIG. 6, this shows an example of a curvature sensor installation. A curvature sensor 300 spirals within a tensile armour layer of a flexible pipe body 600 with a lay angle 602 (relative to the longitudinal axis 604 of the pipe body 600) of 40°. The curvature sensor 300 is shown in phantom where it is behind the flexible pipe body 600. The flexible pipe body 600 has a diameter 606 of 0.4 m (to the tensile armour layer where the curvature monitor is positioned, measured to the point of the curvature sensor closest to the centre of the pipe body). The flexible pipe body 600 is shown curved with a typical bend radius 608 of 3.5 m (to the centre of the flexible pipe body 600). Referring to the cross section of the curvature sensor 300 in FIG. 4, in one embodiment the curvature sensor may be 6.8 mm thick in the radial direction (Y axis), with the neutral axis 308 being at the mid-point of the curvature sensor 300, and the offset of the second strain sensor 304 may be 2.5 mm (such that the second strain sensor 304 is 2.5 mm further out from the centre of the flexible pipe body 600 than the first strain sensor 302).

The tensile strain applied to the second strain sensor as a result of bending a flexible pipe body 600 as shown in FIG. 6 will be greatest for those portions of the curvature sensor 300 on the outside of the pipe body bend. It will be appreciated that the compressive strain applied to the second strain sensor on the inside of each bend will be substantially the same.

Strain (ε) is a dimensionless parameter calculated by considering the change in length (y) of a component over the total length (l) of a component:

$$\varepsilon = y/l$$

The bending strain applied to the second strain sensor is equal to the amount by which the second strain sensor is stretched (or compressed) divided by the length of that portion of the second strain sensor before the bend is applied. The length along an arc is equal to the radius of the arc (R) multiplied by the angle (x) of the arc in radians:

$$\text{arc length} = x*R$$

For the curvature sensor 300, because the first stain sensor lies along the neutral axis, its length does not change as the curvature sensor is bent. Therefore, assuming temporarily that the curvature sensor runs in the longitudinal directional along the length of the flexible pipe, the offset of the second strain sensor is r and the radius of the bend to the first strain sensor is R then the change in length (y) along an arc can be calculated as:

$$y = x*(r+R) - x*R = x*r$$

The original length of the second strain sensor is equal to the length of the first strain sensor along the arc (x*R) so the total length (l) of the stretched second strain sensor can be calculated as:

$$l = x*r + x*R = x*(r+R)$$

The strain along the arc can therefore be calculated as $$\varepsilon = y/l = (x*r)/x*(r+R) = r/(r+R)$$

For the example of FIG. 6:
r=2.5 mm
R=pipe curve radius plus half the diameter of the pipe body plus half the thickness of the curvature monitor: 3500+200+3.4=3703.4 mm.
Therefore:

$$\varepsilon = y/l = r/(r+R) = 2.5/(3500+200+3.4+2.5) = 6.74*10^{-4}$$

For a curvature sensor that is helically wound about the longitudinal axis of the flexible pipe body as shown in FIG. 6, the bending includes the bending due to the helical winding. Only a proportion of the strain applied to the second strain sensor is a result of the bending of the flexible pipe. The strain due to bending the flexible pipe body 600 is the portion of the strain measured by the second strain sensor 304 which runs along the longitudinal axis of the flexible pipe body:

$$\text{Bending strain} = \cos 40° * 6.74 * 10^{-4} = 5.16 * 10^{-4}$$

This bending strain is within the measurement range for a Brillouin sensor.

Figure 7:
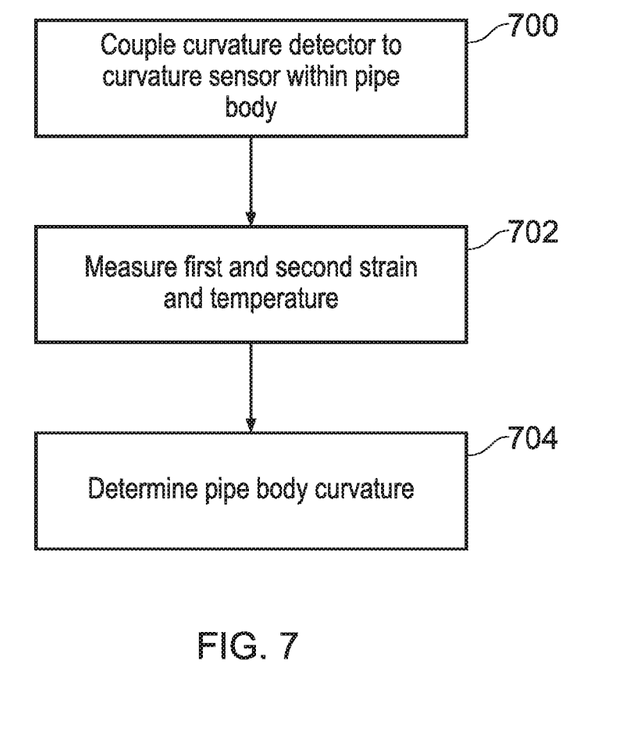
FIG. 7 is a flow chart illustrating a method of measuring the curvature of a flexible pipe body according to an embodiment of the present invention.

Referring now to FIG. 7, a flow chart describing a method of measuring the curvature of a flexible pipe body will now be described. At step 700 a curvature detector, for instance as shown in FIG. 5, is coupled to a curvature sensor, for instance as shown in FIGS. 3 and 4, which is disposed along the length of at least part of a flexible body, for instance as shown in FIG. 6. At step 702 the curvature detector measures the strain sensed by the first and second strain sensors and the temperature sensed by the temperature sensor within the curvature sensor. In particular embodiments of the invention the measured strain and temperature comprise strain and temperature profiles along part or the whole of the length of the optical fibre forming each sensor. At step 704 the strain and temperature profiles are processed to determine the curvature of the curvature sensor along its length. Given knowledge of the initial disposition of the curvature sensor relative to the flexible pipe body (for instance that it is helically wound about the longitudinal axis of the flexible pipe body), the curvature of the flexible pipe can be determined by comparison of the measured curvature of the curvature sensor to the expected curvature of the curvature sensor for a straight pipe.

It will be appreciated that a specific embodiment of a curvature sensor has been described herein based upon the use of Brillouin strain sensing and distributed temperature sensing technology. However, the present invention is not limited to this. Indeed for a curvature sensor based upon the use of optical fibre based strain sensors, while Brillouin detector technology is suitable due to the expected range of strain for the specific example of a flexible pipe installation, other optical strain sensing techniques may be equally suited or preferable depending on the particular deployment scenario. It is assumed that the skilled person is well acquainted with optical sensing techniques and is capable of selecting a suitable approach depending upon the deployment scenario. Alternative optical strain sensing techniques may be unaffected by temperature and therefore separate sensing and compensation for temperature may not be required. Where temperature sensing is necessary or desirable to separate the affects upon an optical fibre of strain and temperature, other suitable techniques for sensing the temperature of the curvature sensor may be used, and these need not be optical.

Indeed, while optical strain sensing techniques are described within the present specification, the first and second strain sensors need not be optical sensors. While Brillouin strain sensing has certain advantageous properties for the particular deployment scenario described within the present specification (including that not electrical signal is applied to the flexible pipe body, and that it is suitable for providing a strain profile over an extended distance), any other strain sensing technique may be used, whether electrical or otherwise. Desirably, the strain sensors provide a continuous profile of strain along their length (which may extend to the whole or only part of a flexible pipe), however in other embodiments discrete strain sensing may be applied which provides a measure of strain at discrete points along the length of the curvature sensor.

The measurement techniques described within the present specification may be used to continuously monitor the curvature of a flexible pipe or they may be used periodically or upon demand to measure the current curvature of the flexible pipe. Knowledge of the curvature of the flexible pipe along its length may be used to determine the precise location of each part of the flexible pipe.

As noted above, the curvature sensor may incorporate additional strain sensors both for redundancy and for the case of the second strain sensor so that compression and stretching of the curvature sensor on either side of the neutral axis may be compared. A particular technique for incorporating the curvature sensor into the structure of a flexible pipe has been described, however all that is required is that the curvature sensor is coupled in some way to the flexible pipe so that as flexible pipe bends, so does the curvature sensor. Helically winding the curvature sensor about the longitudinal axis of the pipe advantageously allows compression of the second strain sensor for those portions on the inside of the pipe bend to be compared with stretching of the second strain sensor for those portions on the outside of the pipe bend. Alternatively, or in addition, two or more curvature sensors may be provided so that the same pipe bend may be sensed at two or more different locations around the circumference of the pipe. As one example, two curvature sensors may be provided and helically wound in opposite directions within different tensile armour layers.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe body comprising:
   an elongate curvature sensor; and
   a tensile armour layer comprising helically wound tensile armour wires, the curvature sensor being positioned within the tensile armour layer helically wound adjacent to at least one tensile armour wire such that bending strain applied to the flexible pipe body is transmitted to the curvature sensor;

wherein the curvature sensor is smaller than an adjacent tensile armour wire in at least one of depth and width and arranged to slide longitudinally relative to the adjacent tensile armour wire;

wherein the curvature sensor comprises
- an elongate, flexible sensor body having a neutral plane extending through the sensor body along a length of the sensor body, and
- first and second elongate strain sensors disposed along the sensor body;

wherein the first strain sensor is disposed within the neutral plane of the sensor body such that bending of the sensor body in a plane extending along the length of the sensor body and normal to the neutral plane does not apply strain to the first strain sensor;

wherein the second strain sensor is offset from the neutral plane; and wherein strain sensed by the first strain sensor is indicative of tensile strain applied along the length of the sensor body and strain sensed by the second strain sensor is indicative of a combination of tensile strain applied along the length of the sensor body and strain induced by bending the sensor body in the plane extending along the length of the sensor body and normal to the neutral plane.

2. A flexible pipe body according to claim 1, wherein each strain sensor comprises an optical fibre strain sensor coupled to the sensor body such that tensile strain applied to the sensor body is transmitted to both strain sensors and bending strain applied to the sensor body is transmitted to the second strain sensor.

3. A flexible pipe body according to claim 2, further comprising a temperature sensor disposed along the sensor body.

4. A flexible pipe body according to claim 3, wherein the temperature sensor comprises an optical fibre temperature sensor coupled to the sensor body such that tensile strain and bending strain applied to the body is not transmitted to the optical fibre.

5. A flexible pipe body according to claim 1, wherein the curvature sensor is arranged such that bending the flexible pipe body causes the sensor body to bend in the plane extending along the length of the sensor body and normal to the neutral plane.

6. A pipeline apparatus comprising:
a flexible pipe body according to claim 1;
an end fitting coupled to at least one end of the pipe body; and
a curvature detector coupled to the first and second strain sensors of the curvature sensor through the end fitting;
wherein the curvature detector is arranged to measure a strain profile along each of the strain sensors.

7. A pipeline apparatus according to claim 6, wherein the curvature detector is arranged to calculate a bending strain profile indicative of bending strain applied to the curvature sensor from the strain profiles of the first and second strain sensors.

8. A pipeline apparatus according to claim 7, wherein the flexible pipe body further comprises a temperature sensor disposed along the sensor body and wherein the curvature detector is further arranged to measure a temperature profile along the temperature sensor and to adjust the calculation of the bending strain profile to account for the effect of temperature on the strain profiles for each of the strain sensors.

9. A pipeline apparatus according to claim 7, wherein the curvature detector is further arranged to determine the shape of the flexible pipe body from the bending strain profile.

10. The flexible pipe body of claim 1, wherein the first and second elongate strain sensors have a length that extends parallel to the length of the sensor body.

11. The flexible pipe body of claim 1, wherein the first elongate strain sensor extends lengthwise within the neutral plane.

12. The flexible pipe body of claim 1, wherein the first and second elongate strain sensors extend parallel to one another along the sensor body.

13. The flexible pipe body of claim 1, wherein the second strain sensor is offset from the neutral plane in a radial direction of the flexible pipe body.

14. A method of sensing a shape of a flexible pipe body, the flexible pipe body comprising:
an elongate curvature sensor comprising an elongate, flexible sensor body having a neutral plane extending through the sensor body and along a length of the sensor body, and first and second elongate strain sensors disposed along the sensor body, the first strain sensor being disposed within the neutral plane of the sensor body such that bending of the sensor body in a plane extending along the length of the sensor body and normal to the neutral plane does not apply strain to the first strain sensor, and the second strain sensor being offset from the neutral plane, wherein strain sensed by the first strain sensor is indicative of tensile strain applied along the length of the sensor body and strain sensed by the second strain sensor is indicative of a combination of tensile strain applied along the length of the sensor body and strain induced by bending the sensor body in the plane extending along the length of the sensor body and normal to the neutral plane; and
a tensile armour layer comprising helically wound tensile armour wires, the curvature sensor being positioned within the tensile armour layer helically wound adjacent to at least one tensile armour wire such that bending strain applied to the flexible pipe body is transmitted to the curvature sensor, wherein the curvature sensor body is smaller than an adjacent tensile armour wire in at least one of depth and width and arranged to slide longitudinally relative to the adjacent tensile armour wire;
wherein the method comprises:
measuring a strain profile for each of first and second strain sensors;
calculating a bending strain profile indicative of bending strain applied to the curvature sensor from the strain profiles of the first and second strain sensors; and
determining the shape of the curvature sensor from the bending strain profile;
wherein the determined shape of the curvature sensor is indicative of the shape of the flexible pipe body.

15. The method of claim 14, wherein the first elongate strain sensor extends lengthwise within the neutral plane.

16. A method of forming a flexible pipe body, the method comprising:
helically winding tensile armour wires to form a tensile armour layer;
wherein an elongate curvature sensor is helically wound within the tensile armour layer adjacent to at least one tensile armour wire such that bending strain applied to the flexible pipe body is transmitted to the curvature sensor;

wherein the curvature sensor comprises an elongate, flexible sensor body that is smaller than an adjacent tensile armour wire in at least one of depth and width and arranged to slide longitudinally relative to the adjacent tensile armour wire;

wherein the sensor body has a neutral plane extending through the sensor body along a length of the sensor body, and the curvature sensor further comprises first and second elongate strain sensors disposed along the sensor body;

wherein the first strain sensor is disposed within the neutral plane of the sensor body such that bending of the sensor body in a plane extending along the length of the sensor body and normal to the neutral plane does not apply strain to the first strain sensor;

wherein the second strain sensor is offset from the neutral plane; and wherein strain sensed by the first strain sensor is indicative of tensile strain applied along the length of the sensor body and strain sensed by the second strain sensor is indicative of a combination of tensile strain applied along the length of the sensor body and strain induced by bending the sensor body in the plane extending along the length of the sensor body and normal to the neutral plane.

17. A method of forming a pipeline apparatus, the method comprising:

forming a flexible pipe body according to claim 16;

coupling an end fitting to at least one end of the pipe body; and coupling a detection apparatus to the curvature sensor through the end fitting;

wherein the detection apparatus is arranged to:

calculate a bending strain profile indicative of bending strain applied to the curvature sensor from the strain profiles of the first and second strain sensors; and determine the shape of the flexible pipe body from the bending strain profile.

18. The method of claim 16, wherein the first elongate strain sensor extends lengthwise within the neutral plane.

* * * * *